Oct. 18, 1966     H. BIERDUMPFEL     3,279,953
INSULATING SEALS FOR METALLIC SEALED BATTERY CASINGS
Filed Nov. 12, 1963     2 Sheets-Sheet 1
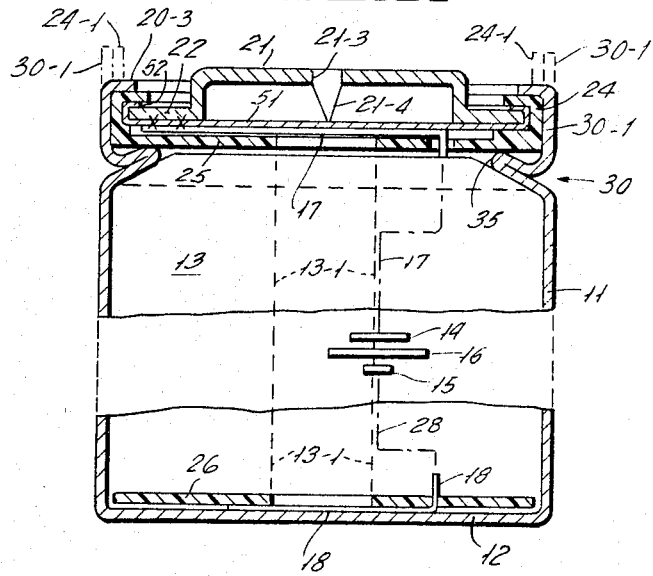
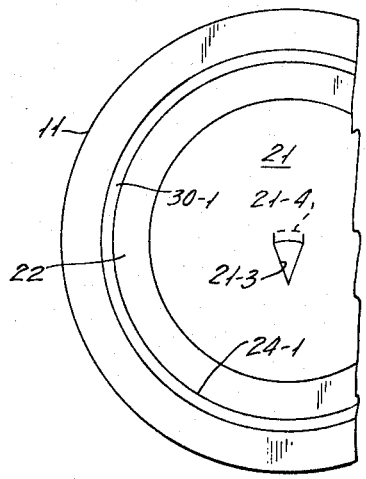
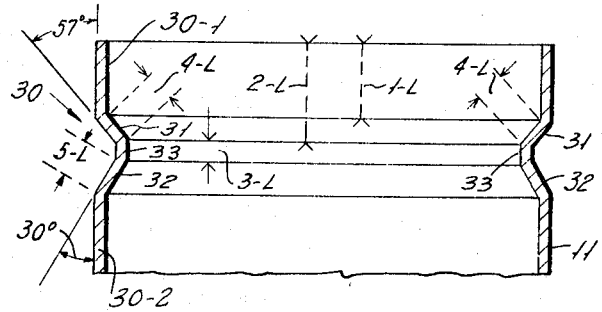
INVENTOR.
HANS BIERDUMPFEL
BY
OSTROLENK, FABER, GERB & SOFFEN
ATTORNEYS Oct. 18, 1966   H. BIERDUMPFEL   3,279,953
INSULATING SEALS FOR METALLIC SEALED BATTERY CASINGS
Filed Nov. 12, 1963   2 Sheets-Sheet 2
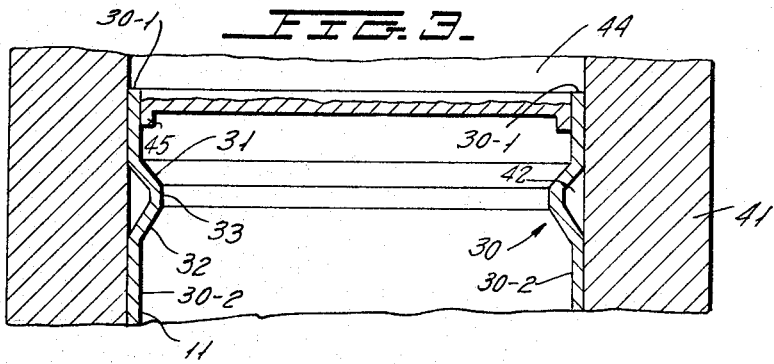
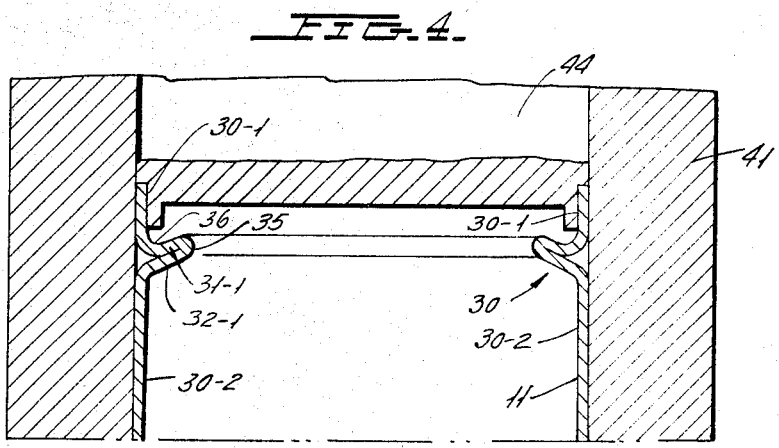
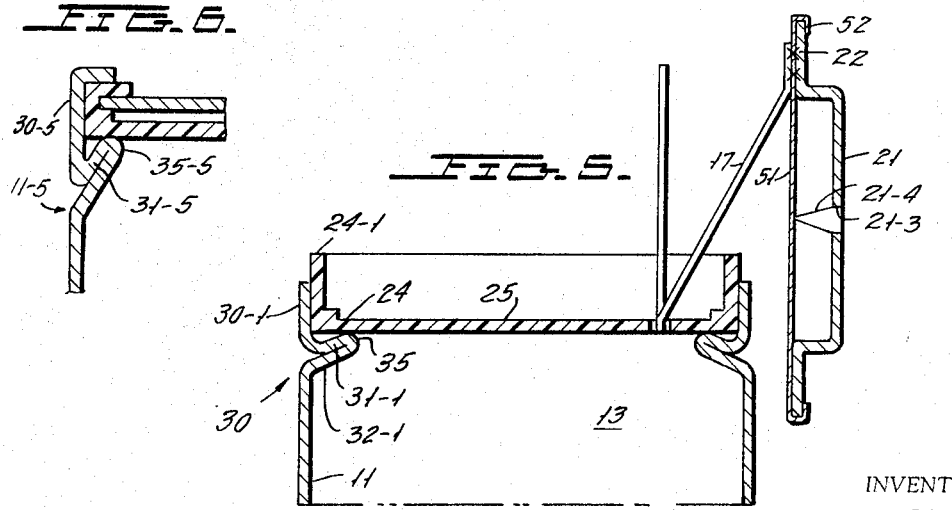
INVENTOR.
HANS BIERDUMPFEL
BY
OSTROLENK, FABER, GERB & SOFFEN
ATTORNEYS

United States Patent Office 3,279,953
Patented Oct. 18, 1966

3,279,953
INSULATING SEALS FOR METALLIC SEALED BATTERY CASINGS
Hans Bierdumpfel, Spring Valley, N.Y., assignor to Sonotone Corporation, Elmsford, N.Y., a corporation of New York
Filed Nov. 12, 1963, Ser. No. 322,824
5 Claims. (Cl. 136—133)

This invention relates to insulating seals for the metallic casing of sealed battery cells. Specifically, it relates to the insulating seal junction between the open end of the tubular metallic sheet casing and the metallic sheet cover enclosure which also constitutes the two opposite-polarity terminals of sealed cells, such as used, for example, in flashlights, although similar sealed casings have also been used in other applications.

To provide such sealed metallic casing with a reliable insulating junction seal between its opposite terminal walls, the open end region of its tubular metallic casing was provided with an inward recess as shoulder projection against which the rim of the metallic cover and its overlapping insulating collar have been held tightly clamped by the crimped over casing edge. Such prior sealed casings are described, for example, in U.S. Patent Nos. 2,240,836, issued May 6, 1941, 2,569,159, issued September 25, 1951, and 2,901,529, issued August 25, 1959. However, such insulating casing seals had only limited effectiveness in suppressing leakage of alkaline battery cells. As an example, in sealed nickel-cadmium battery cells, corrosive electrolyte from sealed casings, the electrolyte leakage is observable as a decomposition product along the crimped over edge seal of the tubular metallic cell casing.

Among the objects of the invention are metallically encased batteries exhibiting a much higher order of leakage suppression at their insulating seals than heretofore obtainable.

In accordance with the invention, insulating seals for the metallic cell casings of sealed batteries exhibiting a higher order of reliability in suppressing electrolyte leakage is achieved as follows: The junction region at the upper open end of the tubular metallic cell casing is provided with an inwardly deformed casing recess or projection having a narrow inward edge which protrudes upwardly toward the casing opening beyond its adjoining rearward portions. As a result the clamping pressure of the crimped over outer metallic casing edge causes the upwardly protruding inward narrow projection edge to penetrate a substantial depth into the facing insulating collar wall portion and thereby establish therewith a positive leakage suppressing casing seal of high order of reliability. The two inwardly deformed casing recess wall portions are given such different relative length as to cause its inward narrow projection edge to be turned upwardly toward the casing opening and protrude above its rearward protrusion wall portion for concentrating the sealing pressure along the narrow edge surface of the recess projection edge and provide the reliable leakage sealing joint with the facing insulating collar wall.

For the sake of simplicity, the open end of the tubular metallic cell casing is herein designated in the specification and claims as the "upper" casing end and the opposite casing end as the "downward" casing end.

The invention also comprises a novel production of a tubular metallic cell casing with an upwardly turned edge of an inward recess projection the edge of which is turned upwardly toward the open end of the casing. This is achieved by scoring or forming in the upper junction region of the tubular casing an inward casing recess having an upward recess wall and a downward recess wall tapering outwardly in opposite directions from a common inward recess edge, with the downward recess wall being radially longer than the upward recess wall. Thereupon the opposite tubular wall portions adjoining inward casing recesses are moved toward each other, thereby causing the radially longer downward recess wall to turn the inward recess edge in upward direction toward the casing opening until the recess edge protrudes with a narrow edge suface upwardly toward the casing opening beyond adjacent rearward recess wall portions. As a result, the rim of the casing end wall with its overlapping insulating collar, upon being compressed by the crimped-over upper casing edge, forces the upwardly turned recess edge into the overlying insulating collar wall air and establishes therewith a positive compressed casing seal which is effective in suppressing electrolyte leakage from the cell casing.

The foregoing and other objects and features of the invention will be best understood from the following descriptions of exemplifications thereof, reference being had to the accompanying drawings wherein FIG. 1 is a cross-sectional view of one form of a battery cell having a sealed casing exemplifying the invention;

FIG. 1A is a top view of the cell of FIG. 1;

FIG. 2 is a cross-sectional view of the upper part of the tubular cell casing of the cell of FIG. 1, in an initial stage of forming its upwardly turned sealing projection edge;

FIG. 3 is a cross-sectional view similar to FIG. 2, the upper tubular casing portion similar to FIG. 1, together with the associated shaping tools used for deforming the casing recess into an upwardly turned casing projection;

FIG. 4 is a view similar to FIG. 3 in a subsequent production stage wherein the casing recess of FIG. 3 is deformed into an upwardly turned inward casing wall projection having an upwardly facing seating edge;

FIG. 5 shows the tubular cell casing of FIG. 4 with the associated metal cover and insulating collar prior to assembly and joining them into the sealed cell casing of FIG. 1; and FIG. 6 is a view similar to FIG. 1, of a modified cell casing seal in accordance with the invention.

Although the crimped-over insulating seal for tubular metallic casings of the present invention is of critical value in connection with sealed batteries, it is also of value in other applications requiring leakage-suppressing insulating seals between a tubular metallic casing and an adjoining metallic casing wall.

As an example of the invention, FIG. 1 shows a sealed alkaline battery wherein a tubular metallic casing cell enclosure is combined with a metallic cover having a thin underlying metallic sheet arranged to be ruptured under excess internal pressure of the type described in U.S. Patent No. 3,081,366, issued March 12, 1963.

The cell of FIG. 1 has a sealed casing enclosure comprising a tubular metallic casing 11 having a closed bottom wall 12 and straight side walls leading to an upper casing opening thereof. Within the casing 11 above its bottom wall 12 is enclosed a tubularly shaped electrode assembly, diagrammatically indicated as comprising two superposed opposite-polarity electrodes 14, 15, separated by an electrolyte holding porous separator 16, wrapped in a film of insulating material which insulates it from the surrounding metallic casing walls 11.

Although the cross-section of the tubular casing 11 and electrode assembly 13 may be of other shape, they are usually and are shown as being of circular cross-section. The positive and negative cell electrodes 14 and 15 are connected through metallic tabs 17, 18 to housing cover 21 and to the bottom wall 12 of tubular casing 11, respectively, which constitute the exposed cell terminals. Both the tubular casing 11 and the cover wall 21 are of sheet metal. In alkaline batteries, such as nickel-cadmium batteries, good results are obtained with casings of steel having an electroplated coating of nickel. The metallic cover wall 21 may be flat or as shown may have a raised hollow portion projecting beyond the surrounding cover rim 22, the edge of which is joined by a leakage-tight insulating joint to the surrounding junction wall portion 14 of the tubular casing 11.

The metal cover 22 is held electrically insulated from surrounding tubular casing junction portion 14 by an insulating collar 24 which before completion of the sealing operation has an L-shaped cross-section, as indicated by dash lines 24–1. Although the L-shaped insulating collar 24 overlapping the metallic covering 22 may form a separate structure it is shown as an integral part of an insulating separator sheet 25 interposed between the top of the electrode assembly 13 and the overlying metallic cover structure 21.

The upper electrode-assembly tab 17 passes through and over the upwardly facing surface of the upper separator sheet 25 and the front end of tab 18 is shown welded by XX symbol to an underlying portion of the metallic cover 22 for connecting thereto positive cell electrode. A similar insulating sheet 26 separates the bottom surface of the electrode assembly 13 from the metallic bottom casing wall 12. The opposite negative electrode tab 18 of the electrode assembly extends through a slit of insulator sheet 26 and its end is affixed as by welds XX to central portion of casing-bottom wall 12 for connecting thereto negative cell electrode 15.

In the original condition, the entire length of the tubular side walls, including its upper junction portion 14, are straight and without any inward projections and the electrode assembly 13, together with its bottom insulating sheet 26, may be inserted with a tight fit through the upper casing opening into its interior as seen in FIG. 1. This is done after first passing the bottom electrode tab 18 through the slit and along the underside of the bottom insulating sheet 26 so that the end of electrode tab is exposed under the central hollow space 13–1 of the electrode assembly in contact with casing bottom wall 12. Thereupon opposite welding electrodes are applied through the hollow central space 13–1 of the electrode assembly 13 to the facing end of electrode tab 18 and to the exterior of the underlying casing wall 12 to join them by welding.

In accordance with the invention, after positioning the electrode assembly in the bottom of the straight tubular casing 11, its open upper end wall portion 14 is subjected to a recess-scoring operation which forms therein a specially shaped inwardly projecting wall recess 30.

In accordance with the invention the downward recess wall 32 is made sufficiently longer than the upward recess wall 31 as to cause contracting movement of the two adjoining cylindrical casing wall portions 30–1, 30–2 toward each other from FIG. 3 to FIG. 4 position to force upward recess wall 31 in upwardly outward direction to the position 31–1 (FIG. 4) and thereby deform the inward recess wall portion 33 into a narrow recessed edge 35 (FIGS. 4, 5) protruding upwardly toward the casing opening beyond adjoining upwardly facing portions of upper recess wall 31–1. Depending on the size of the cell and its cell casing, the relative dimensions of the length 5–L of the downward recess wall 32 in relation to the length 4–L of upper recess wall 31 and their inward recess wall 33 may be readily chosen to secure the upward lateral turning of the upper wall recess 35 deforming inward recess wall portion into a narrow recess edge protruding vertically upward toward the opening beyond more rearward portions of the so-deformed recess wall portions.

To enable more ready practice of the invention there are given below, by way of example, and without being limited thereto, details of a specific cell casing of a specific type nickel-cadmium battery cell of the invention, such as designed for electric shavers and similar application.

The cylindrical cell casing of steel has wall thickness of .014 to .017 inch, and outside diameter of .865 inch.

The upper recess wall 31 is inclined 57° relative to its upwardly adjoining vertical upward casing side wall. The downward recess wall 32 is inclined 30° relative to its adjoining vertical downward casing wall. The vertical height 1–L from its upper outer open casing edge to the outer corner joint with upper recess wall 31 is .132 inch; and 2–L to the horizontal plane from the next corner joint between recess walls 31 and 33 is .185 inch. The vertical height 3–L of the inner vertical recess wall 33 is .025 inch (FIG. 2).

A metal casing with a recess 30 of the foregoing dimensions, when deformed from the shape of FIG. 2 or FIG. 3 to that of FIG. 4 or FIG. 5, will have in such deformed condition the following dimensions: The vertical height from the upper open casing edge to the upwardly protruding narrow recess edge 35 is .105 inch and the height from the top casing edge to the deepest portion of the depression 36 formed by the upwardly turned upper recess wall 31–1 is .122 inch.

Such specially shaped casing recess 30 may be produced with a corresponding specially shaped recess-scoring roller having a vertical rotation axis and being part of an otherwise conventional scoring equipment used for scoring conventional recesses in a similar cylindrical metal casing as described in the above-referred prior patents. The two cylindrical casing wall portions 14–1 of FIG. 3 adjoining the casing recess may be moved to their contracted position of FIG. 4 by suitable contraction tools. As an example, such contracting equipment may consist of a tool sleeve 41 having a cylindrical passage 42 within which the cylindrical self-casing 11 fits and is held, cooperating with a plunger 44 of cylindrical shape fitting and moveable in vertical direction within the tool sleeve. The downward edge of plunger 44 has an end shoulder 45 of a diameter smaller than the diameter of the wider plunger body by a dimension equal to twice the wall thickness of the upper tubular casing portion 30–1 within which it fits. The projecting inward plunger shoulder portion 45 may be of a length equal to the height of the upper casing side wall portion 30–1 projecting above its narrow corner joint to its adjoining upper recess wall 31. The tool sleeve 41 has suitable means, such as backing plunger, not shown, preventing or limiting downward movement of the cylindrical casing 11 when it is deformed from condition of FIG. 3 to that of FIG. 4. With the cylindrical casing 11 so held in tool sleeve 41, downward movement of plunger 44 engaging upper edge and the inner surface of upper casing wall portion 30–1 will force it downwardly and thereby cause the two recess side walls 31, 32 and their narrow recess wall 33 to be deformed into the inwardly upwardly protruding inward recess projection shown in FIGS. 1, 4 and 5, with an upward recess edge 35 protruding upwardly beyond all other adjoining portions of the recess walls 31–1, 32–1, and above the upwardly facing depression 36 formed in the upwardly turned upper recess wall 31–1, as seen in FIGS. 4 and 5.

In the sealed battery cell shown in FIGS. 1 and 2, the seal for the interior of the casing is completed by a thin but strong metallic cover sheet 51 underlying the entire area of the much thicker and stronger metallic cover 21 with its rim 22, as described and claimed in copending application of L. Belove, Ser. No. 109,196, filed May 10, 1961. The thin sealing sheet 51 has a rim 52 overlapping on all sides the strong and thick cover rim 22 and is held affixed therewithtogether with overlapping insulating collar 24 to the tubular casing 14 with a positive seal against the narrow upwardly turned circular casing recess edge 35 by the sealing force of the crimped over upper casing edge 20–3. The strong cover wall 21 is shown as having a cover opening 21–3 formed by cutting therein a pointed downward tooth projection 21–4 held opposite the underlying central portion of the metallic cover sealing sheet 51. The cover sealing sheet 51 is of rolled metal of higher density to provide a gas-tight seal for the casing interior, yet sufficiently thin to bulge outwardly and be opened by the pointed outer cover tooth, 21-4 for releasing excess internal gas pressure developed in the cell, for instance by recharging with an excessively large current.

The specific exemplifications of the invention described above in connection with FIGS. 1 to 5 will suggest various other modifications and applications thereof. As an example, by increasing the radial length of lower casing recess wall 32 in relation to the upper casing recess wall 31 (FIGS. 2, 3 and 4) the contraction of the adjoining cylindrical casing portions to the end position seen in FIG. 4 will yield a tubular cell casing 11-5 with an upwardly protruding narrow recess edge 35-5, such as seen in FIG. 6. In the embodiment of FIG. 6 the upwardly turned inward protrusion wall 31-5 with its narrow protrusion edge is inclined under a more acute angle relative to the surrounding casing wall 30-5 than in the previously described sealing joint 35. It is accordingly desired that the claims shall not be limited to the specific exemplifications of the invention described and/or shown herein.

The embodiments of the invention in which an exclusive privilege or property is claimed are defined as follows:

1. In a sealed battery cell having an electrode assembly of at least two opposite-polarity electrodes and associated electrolyte:
   a metallic enclosure comprising a tubular metallic casing and a metallic cover sheet enclosing said assembly and connected to said two electrodes, respectively,
   said cover sheet having a peripheral cover rim affixed to the surrounding casing junction region near the open casing end of said tubular casing,
   an insulating separator collar overlapping and separating said cover rim from said casing junction region,
   a tubular section of said casing junction region having a double-wall inward casing projection with narrow inward sealing edge protruding beyond adjoining portions of said projection toward said open casing end,
   the outer end of said casing junction region being clamped over the outer surface and clamping said cover rim together with said overlapping separator collar under sealing pressure against said protruding sealing edge for suppressing escape of electrolyte from the casing enclosure.

2. In a sealed battery cell as claimed in claim 1, two wall portions of said double wall casing projection extending generally radially from said narrow sealing edge, being in abutting wall engagement with each other.

3. In a sealed battery cell having an electrode assembly of at least two opposite-polarity electrodes and associated electrolyte:
   a metallic enclosure comprising a metallic tubular casing and a metallic cover sheet enclosing said assembly and connected to said two electrodes, respectively,
   a thin high-density metallic sheet underlying the entire area of said cover sheet and overlapping the cover rim,
   the said cover sheet and said underlying thin sheet having an overlapping rim region affixed to the surrounding casing junction region of the open casing end of said tubular casing,
   an insulating separator collar overlapping and separating said cover rim region from said casing junction region,
   a tubular section of said casing junction region having a double-wall inward casing projection with a narrow inward sealing edge protruding beyond joining portions of said projection toward said open casing end,
   said casing junction region being clamped over the outer surface of and clamping cover rim region, holding it together with said overlapping separator collar under sealing pressure against said protruding sealing edge for suppressing escape of electrolyte from the casing enclosure,
   a portion of said cover sheet spaced from the rim thereof having a cover opening to the exterior space,
   said thin metallic sheet being sufficiently thin to cause it to be broken open under predetermined high gas pressure within said enclosure for discharging interior gases through said cover opening to the interior space.

4. In a sealed battery cell as claimed in claim 3, two wall portions of said double wall casing extending generally radially from said narrow sealing edge, being in abutting wall engagement with each other.

5. In the production of an insulating junction seal between the upper open junction region of a tubular metallic sheet casing and the rim of metallic cover sheet of a sealed battery casing,
   forming in the tubular casing junction region an inward casing recess having an upward recess wall and a downward recess wall tapering outwardly in opposite directions from a common inward recess portion with the downward recess wall being radially longer than the upward recess wall,
   thereafter moving the opposite tubular casing wall portions adjoining said inward casing recess toward each other in direction of their tubular surfaces and thereby turning said upward and downward recess walls in upward direction until the turned inward casing recess protrudes with a narrow sealing edge upwardly beyond the adjacent upwardly facing casing recess wall portions,
   inserting the casing cover wall and said overlapping insulating collar into the open casing junction region together with the sourrounded insulating collar wall over the upper surface of the cover rim for compressing the underlying insulating collar wall against the said protruding narrow recess edge into a positive compressed leakage seal therewith.

References Cited by the Examiner

UNITED STATES PATENTS

| | | |
|---|---|---|
| 1,748,852 | 2/1930 | Smith. |
| 2,665,329 | 1/1954 | Brennan _____ 136—133 |
| 2,766,316 | 10/1956 | Stevens et al. _____ 136—169 |
| 3,081,367 | 3/1963 | Field et al. _____ 136—6 |

FOREIGN PATENTS 46,207 2/1939 Netherlands.

WINSTON A. DOUGLAS, *Primary Examiner.*

D. L. WALTON, *Assistant Examiner.*